United States Patent
Salters et al.

(10) Patent No.: US 7,154,984 B2
(45) Date of Patent: Dec. 26, 2006

(54) FIFO-REGISTER AND DIGITAL SIGNAL PROCESSOR COMPRISING A FIFO-REGISTER

(75) Inventors: Roelof Herman Willem Salters, Eindhoven (NL); Paul Wielage, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 179 days.

(21) Appl. No.: 10/517,586

(22) PCT Filed: May 27, 2003

(86) PCT No.: PCT/IB03/02350

§ 371 (c)(1),
(2), (4) Date: Dec. 9, 2004

(87) PCT Pub. No.: WO03/107172

PCT Pub. Date: Dec. 24, 2003

(65) Prior Publication Data
US 2005/0243639 A1    Nov. 3, 2005

(30) Foreign Application Priority Data
Jun. 14, 2002 (EP) .................................. 02077389

(51) Int. Cl.
*G11C 19/00* (2006.01)

(52) U.S. Cl. ............................ 377/64; 377/66; 377/77; 365/221; 365/78; 710/57

(58) Field of Classification Search .................. None
See application file for complete search history.

(56) References Cited

U.S. PATENT DOCUMENTS

| | | | | |
|---|---|---|---|---|
| 3,953,838 A | * | 4/1976 | Gilberg et al. ................. 365/78 |
| 5,036,489 A | * | 7/1991 | Theobald ...................... 365/73 |
| 6,356,117 B1 | * | 3/2002 | Sutherland et al. ........... 326/93 |
| 6,486,721 B1 | * | 11/2002 | Greenstreet et al. ........ 327/211 |
| 6,772,243 B1 | * | 8/2004 | Jones et al. ................... 710/57 |

* cited by examiner

*Primary Examiner*—Tuan T. Lam (57) ABSTRACT

A FIFO-register (10) according to the invention comprises a sequence of register cells (10.1, . . . ,10.m), which register cells have a data section (40) and a status section (30). Data (Din) provided at an input (20) is shifted via the data sections (40) in the register cells to an output (50). The status section (30) of each cell indicates whether the data section (40) of that cell contains valid data. The status section of a cell comprises a control unit (37) coupled to a status input (32), to a status output (33) and to a clock input (31), and generates an output clock signal ($Cl_i$), which controls charge controlling elements (35, 36) coupled to the status input and the status output and controls the data section (40). The status output (33) of a status section (30) and the status input (32') of its successor (30') share a common capacitive node (33).

5 Claims, 8 Drawing Sheets

FIFO-REGISTER AND DIGITAL SIGNAL PROCESSOR COMPRISING A FIFO-REGISTER

The invention pertains to a FIFO register. Such registers are widely used in data processing and digital signal processing to provide buffer storage. Such a FIFO-register is described in U.S. Pat. No. 3,953,838. The FIFO-register disclosed therein comprises a chain of registers which are coupled to each other via MOS-gates. Data is rippled through the chain of registers. To that end the MOS-gates are controlled by a one-shot device in a control unit, which further comprise combination logic for controlling the one shot device and a status register for storing the status (full or empty) of the corresponding register in the chain. The combination logic controls the one-shot device in response to the output of the one shot device of the succeeding control unit, the output of the one shot device of the preceding control unit, a status signal of the status register and a status signal of the status signal of the preceding control unit. Mutually succeeding control units are coupled to each other via five signal lines.

It is a purpose of the invention to provide a FIFO-register in which the chain of registers are controlled by relatively simple means. According to the invention, a FIFO-register according to claim 1 is provided.

In the FIFO-register according to the invention the registers in the chain have a status section which stores the status of each register dynamically in a capacitive node which is shared with is successor. A control signal is provided which controls the corresponding data register and the charge controlling elements for discharging the capacitive node which it shares with its predecessor and for charging the capacitive node shared with its successor. The control signal is generated by a control unit synchronized by a central clock signal and which is coupled to the capacitive node shared with the predecessor and the capacitive node shared with the successor. This allows for a very simple structure in which the status sections of the registers in the chain are only coupled to each other via the shared capacitive node and to a common clock generator. This simplifies control of the registers in the chain, which allows for a smaller amount of gates and a faster control.

In the embodiment of claim 2 the control unit of the first combination unit first generates a status signal which indicates whether valid data is present at the input AND the status of the corresponding data register is free. Only this one signal then has to be synchronized with the central clock signal in the second combination unit, so as to obtain the output clock signal for controlling the data register and the charge controlling elements.

The embodiment of claim 3 is advantageous in that also the data section of the cells requires only a small number of gates.

This makes it possible to store the data capacitively according to the embodiment of claim 4 enabling a further reduction in gates.

The FIFO-register according to the invention is advantageously used in a digital signal processor, where the FIFO serves for buffering data between a functional unit producing data and a functional unit consuming the data.

These and other aspects of the invention are described in more detail with reference to the drawing.

Therein

Figure 1:
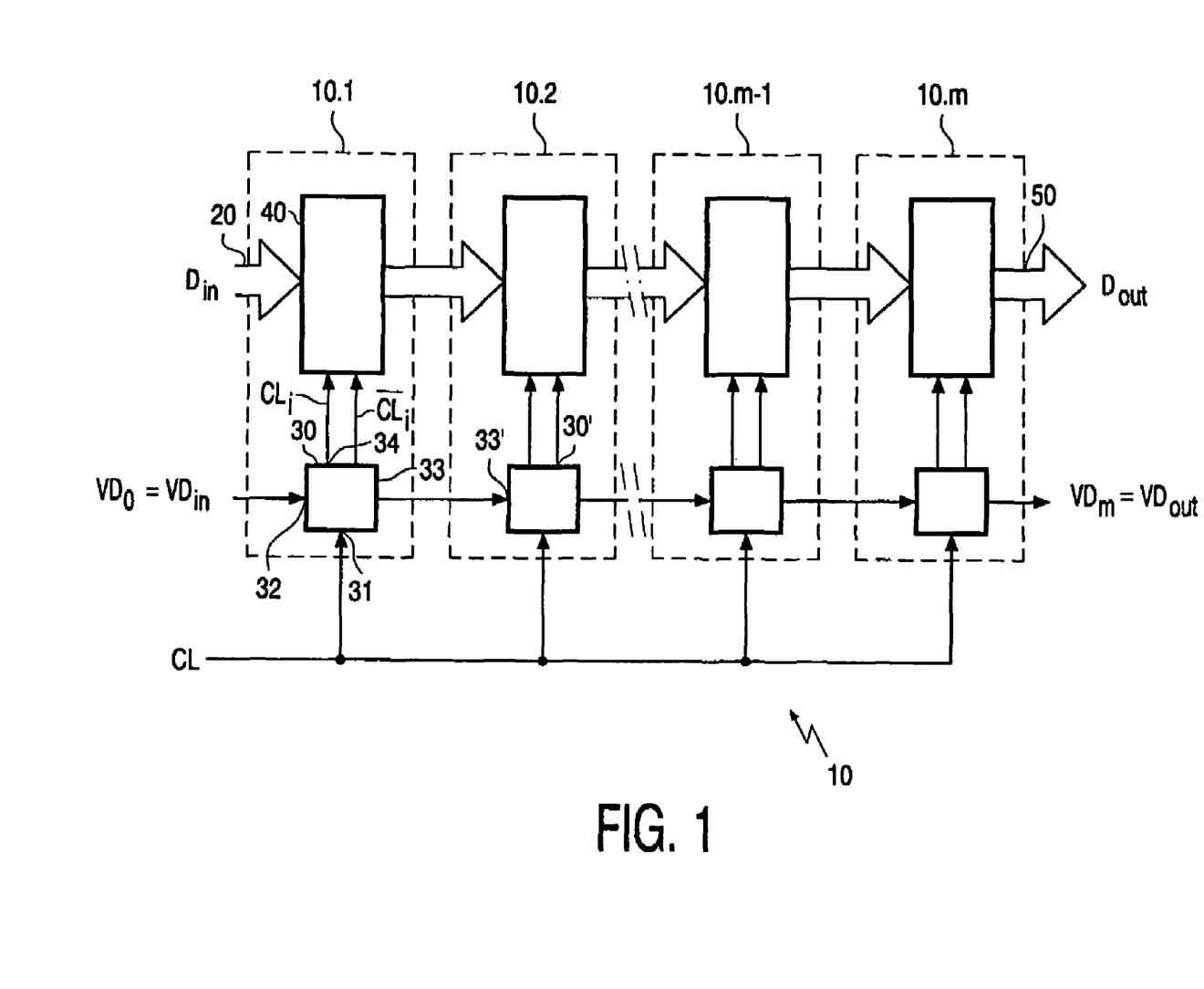
FIG. 1 schematically shows a FIFO-register.

FIG. 1 shows a FIFO-register comprising a sequence of m register cells 10. 1, . . . , 10.m. The register cells 10.1, . . . , 10.m comprise a data section 40 and a status section 30. Data Din provided at an input 20 is shifted via the data sections 40 in the register cells 10.1, . . . , 10.m to an output 50. The status section 30 of each cell 10.1, . . . , 10.m indicates whether the data section 40 of that cell contains valid data.

Figure 2:
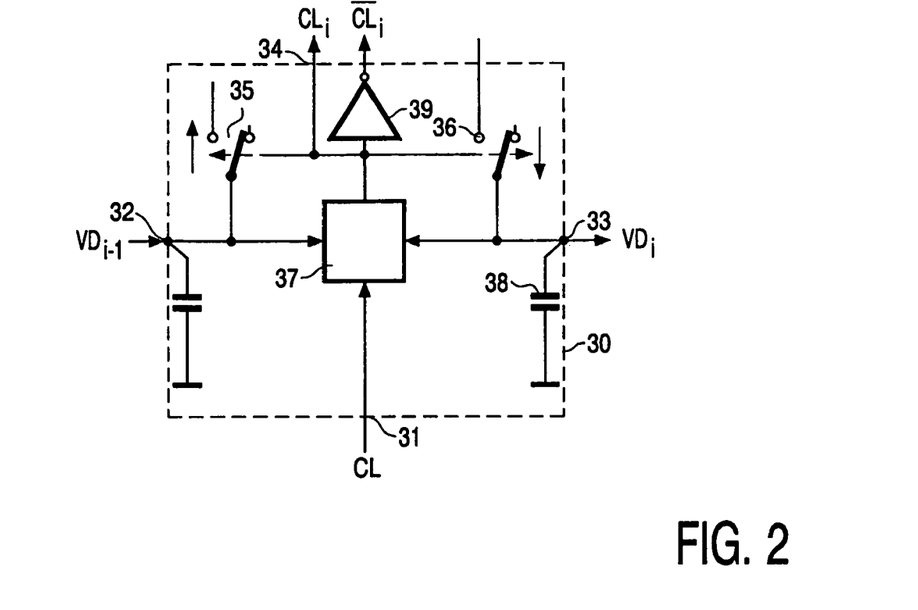
FIG. 2 shows in more detail a status section of a cell of the register of FIG. 1.

The status section 30, in FIG. 2 shown in more detail, comprises a clock input 31 for receiving an input clock signal Cl, a status input 32 for receiving an input status signal VDi−1, a status output 33 for providing an output status signal VDi, a clock output 34 for providing an output clock signal Cli, a first charge controlling element 35 coupled to the status input 32, a second charge controlling element 36 coupled to the status output 33, a control unit 37.

The control unit 37 is coupled to the status input 32, to the status output 33 and to the clock input 31. It generates the output clock signal Cli, which output clock signal controls the charge controlling elements 35, 36 and the data section 40.

The status output 33 of the status section 30 and the status input 32' of its successor 30' share a capacitive node 38 for dynamic storage. The capacitance of the node 38 is realized for example by the parasitic capacitance of the connection between the status output 33 and the status input 32' and may for example be in the order of a tenth to some tens of pF. In this embodiment the status section 30 comprises an inverter 39 for generating an inverted clock signal $\overline{CLi}$. Alternatively the inverted signal $\overline{CLi}$ could be generated in the data section.

Figure 3:
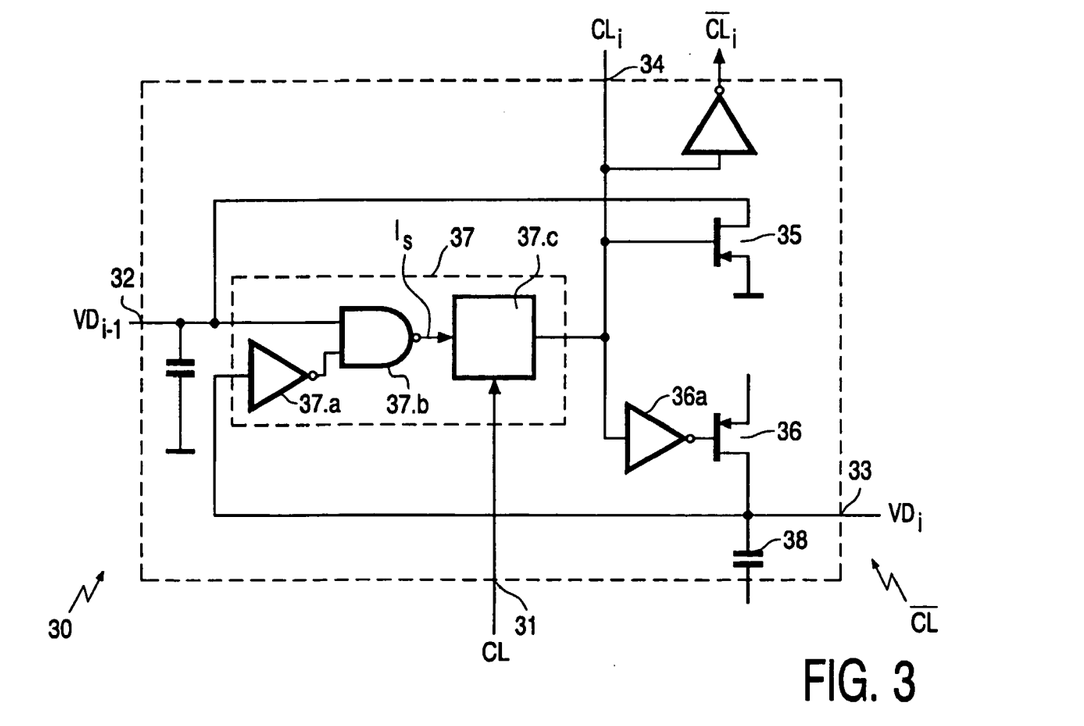
FIG. 3 shows a first embodiment of the status section of FIG. 2.

FIG. 3 shows a first embodiment of the status section of FIG. 2. Parts therein which correspond to those in FIG. 2 have the same reference number. In the embodiment of FIG. 3 the charge controlling elements 35 and 36 are implemented in the form of semiconductor switching elements, respectively by a p-channel and an n-channel FET. In a conducting state the switch 35 connects the node 32 to a negative voltage source, and switch 36 connects node 33 to a positive voltage source.

The n-channel FET is coupled to the control unit 36a by an inverting element 36a. Alternatively, current sources could be used as charge controlling elements. In the embodiment shown the control unit 37 comprises a first combination unit 37a, 37b for combining the input status signal VDi−1 and the output status signal VDi, and for providing in response to these signals an intermediate signal Is to a second combination unit 37c. The second combination unit 37c combines the intermediate signal Is with the input clock signal Cl and generates the output clock signal Cli. The first combination unit comprises an inverting element 37a for inverting the output status signal VDi and generating a signal having a value "1" if and only if the status of the i$^{th}$ cell 10.i is empty. The first combination unit further comprises a NAND-gate 37b for generating the intermediate signal Is, having a value "0" if and only if the i$^{th}$ cell is empty and valid data is offered at its input.

Figure 4:
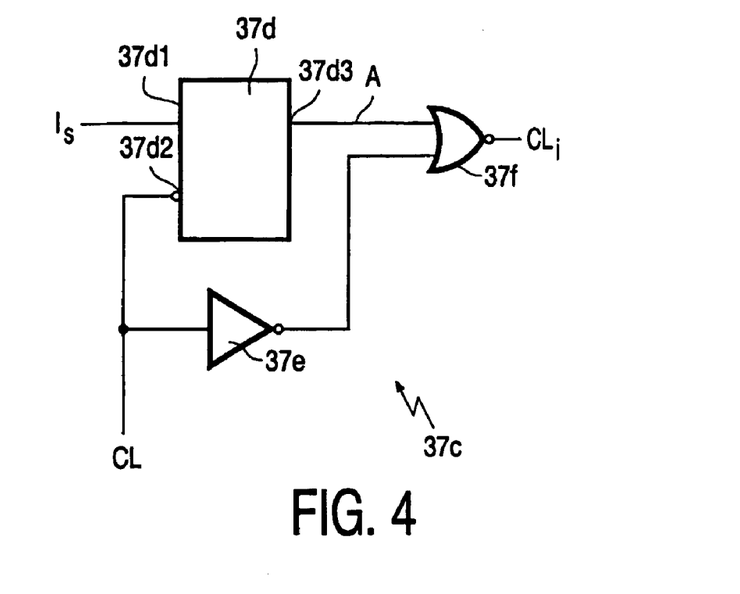
FIG. 4 shows a part of the status section of FIG. 3.

FIG. 4 shows the second combination unit 37c in more detail. It comprises a latch 37d serving as a synchronization element, an inverter 37e and a NOR-gate 37f. The latch 37d transmits the intermediate signal Is offered at input 37d1 if the value of the clock signal Cl offered at input 37d2 is low. The NOR-gate 37f outputs a value "1" if and only if the value at the output 37d3 of the latch 37d is "0" and the clock signal Cl has a value "0".

Figure 5:
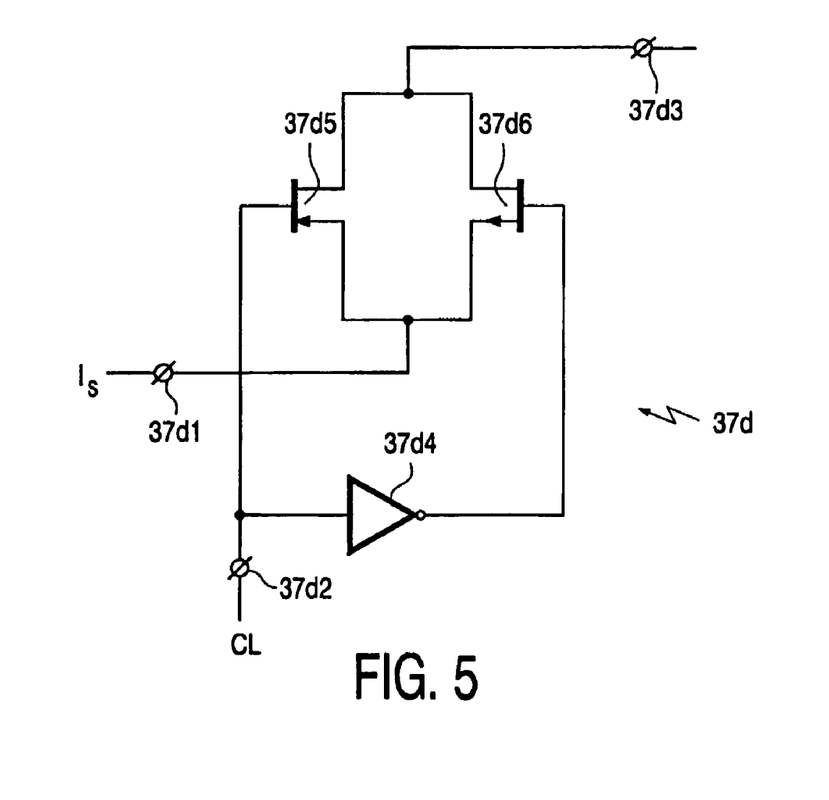
FIG. 5 shows a possible implementation of a part of FIG. 4.

The latch 37d is preferably implemented as shown in FIG. 5, wherein the output value is dynamically stored as a charge in the parasitic capacitance of the connection between the output 37d3 and the input of the NOR-gate 37f. A dynamic storage allows for a small number of components. However, it would also be possible to store the output value of the latch statically. The latch 37d comprises a p-channel MOSFET 37d5 and n-channel MOSFET 37d6, as well as an inverter 37d4 for inverting the clock signal Cl. Instead of using a separate inverter 37d4 and 37e for each control unit 37, instead an inverted clock signal/Cl could be supplied externally. This depends on the choice made between reducing the number of components or reducing the number of connections.

Figure 6:
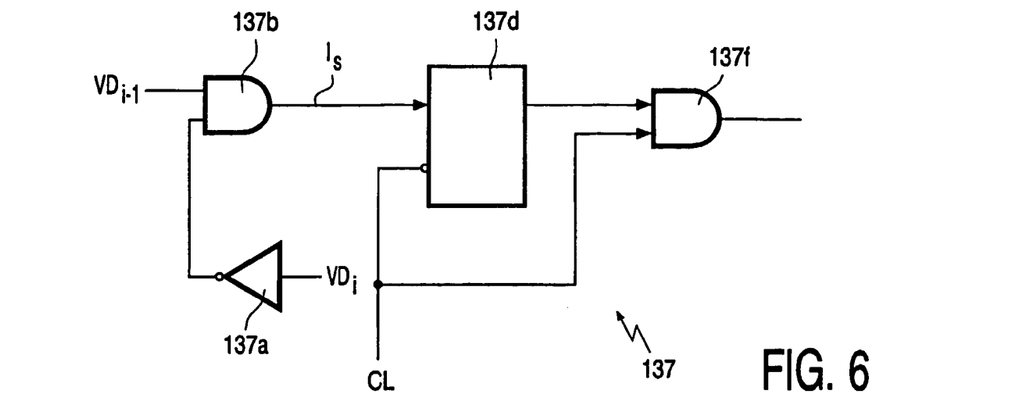
FIG. 6 shows a second embodiment for a part of the status section.

FIG. 6 shows an alternative for the embodiment of FIGS. 3 and 4. Parts therein corresponding with the embodiment of FIG. 3 and 4 have a reference number which is 100 higher. The first combination unit therein comprises AND-gate 137b and inverter 137a. The second combination unit comprises the latch 137d and the AND-gate 137f.

Many further variations are possible to the skilled person. For example a variation wherein valid data is not represented by a "1", but by a "0" could be realized by exchanging the charge controlling elements 35 and 36, and by including the inverting gate 137a between the VDi−1 input and the gate 137b instead of between the VDi input and the gate 137b.

Figure 7:
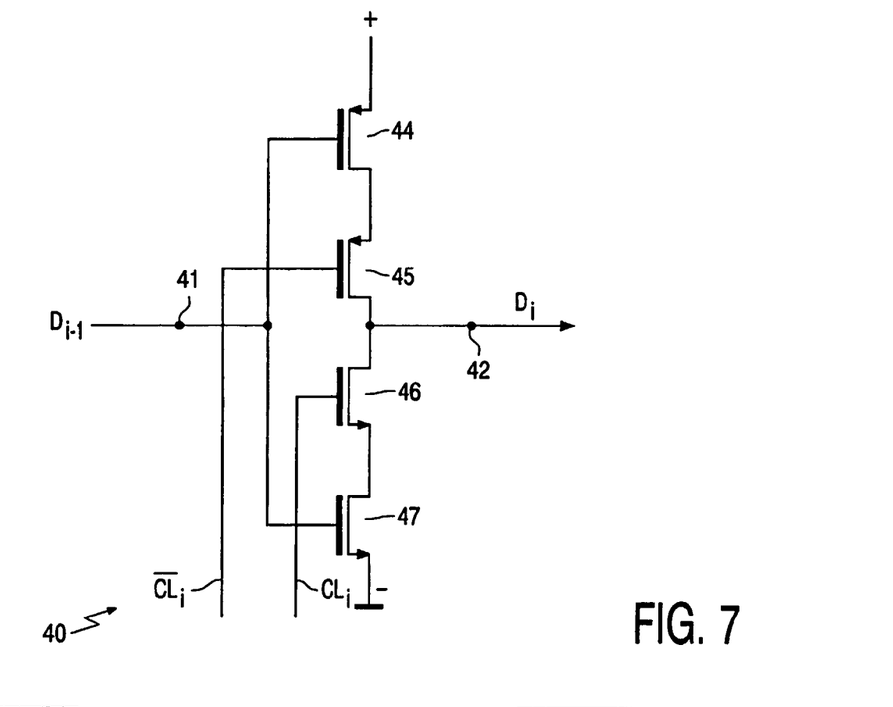
FIG. 7 shows an embodiment of a part of the data section, FIG. 8 schematically shows a digital signal processor using a FIFO-register according to the invention.

FIG. 7 shows an implementation of a storage element in the data section 40 of the cell. Although the data section 40 could contain a single storage element, it will preferably contain a plurality of storage elements. Preferably the plurality is a power of 2 such as 8, 16 or 32.

It comprises a data input 41, a data output 42, a clock input 43 for receiving the output clock signal Cli from the clock output 34 of the status section 30. The data output 42 is coupled via a first chain to a first voltage line+ and via a second chain to a second voltage line−. The first chain comprises the main current path of a first semiconductor element 44 which is controlled by the data input 41, and a second semiconductor element 45 which is controlled by the clock input 43. The second chain comprises the main current path of a third semiconductor element 46 which is controlled by the data input 41, and a fourth semiconductor element 47 which is controlled by the clock input 43. An inverter 48 serves for inverting the clock signal Cl. Instead thereof the inverted clock signal may be generated centrally.

In the embodiment shown in FIG. 7 the data section 40 of the cell shares a capacitive node 42 with the data section of a successor for storage of the data. The capacitance of the node may be realized by the capacitive value of the connection between two succeeding data sections 40, however explicit capacitive means may be added. Dynamic storage realized in this way is favorable in view of the required number of gates. However, alternatively storage could be realized statically, for example by a pair of cross coupled OR-gates.

Figure 8:
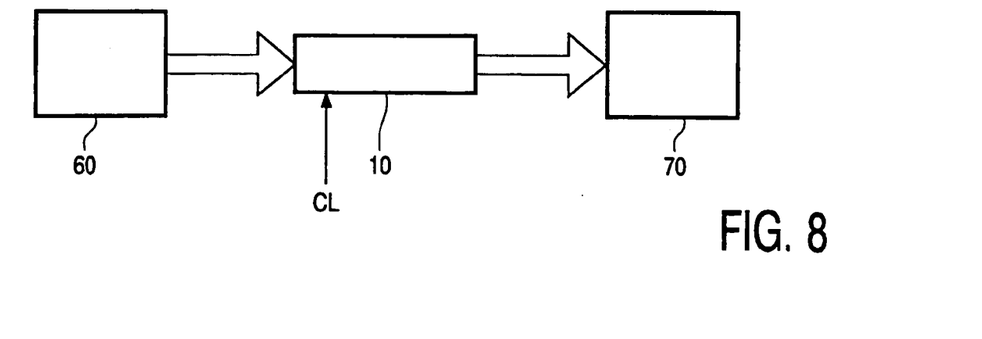

FIG. 8 shows a digital signal processor comprising a first functional unit 60, a second functional unit 80 and a FIFO-register 10 according to the invention as described above for transferring data between the first and the second functional unit.

Figure 9:
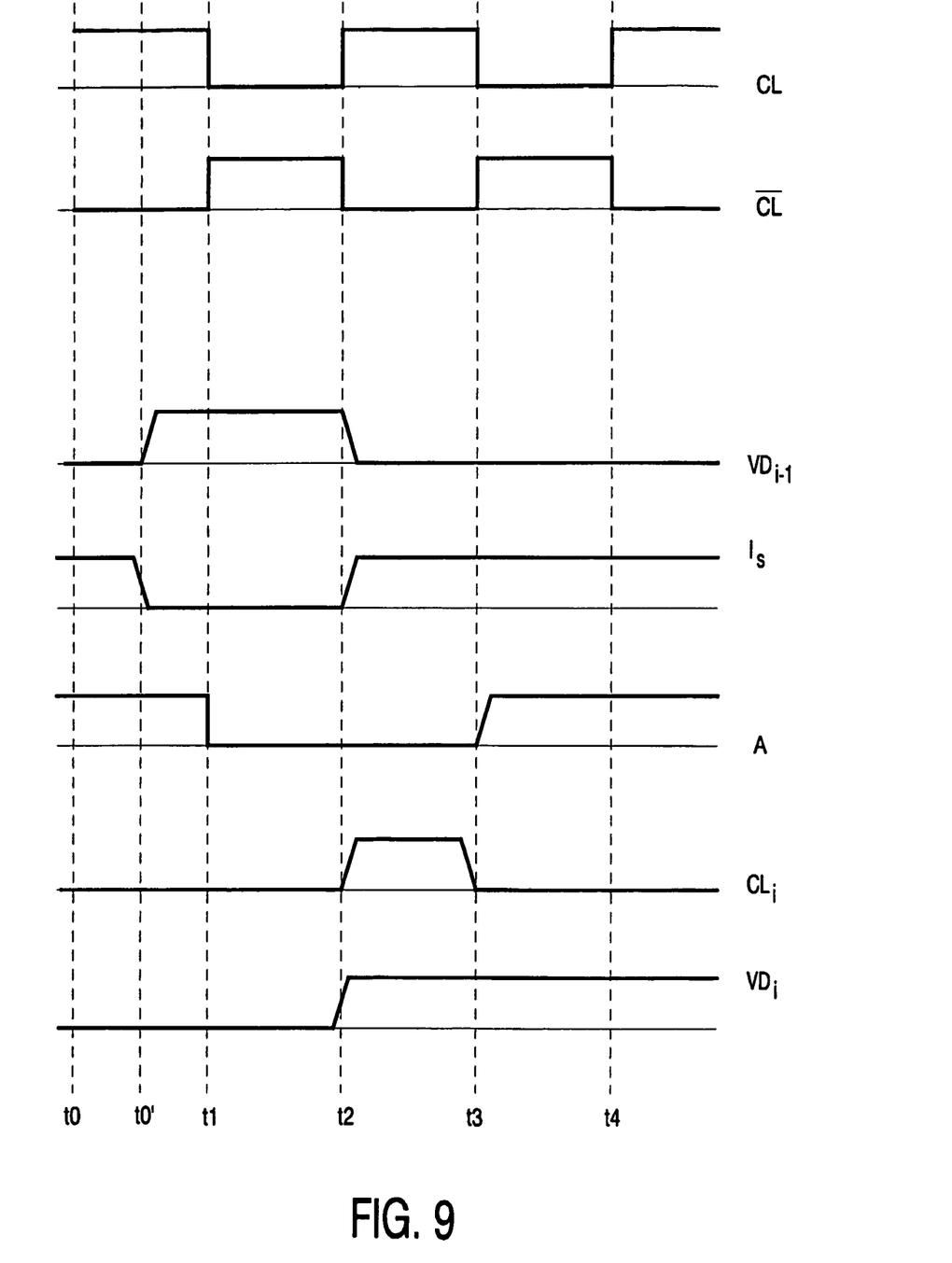
FIG. 9 shows the relation between signals occurring in the status section.

The operation of the FIFO-register according to the invention is now elucidated with reference to FIG. 9.

It is presumed that at a time to the output signal VDi is "0", meaning that no valid data is stored in the cell to which the status section belongs. At t0 further VDi−1="0" indicating that no valid data is offered by the preceding register cell or at the input of the FIFO-register. In that case the intermediate signal Is assumes a value "1" meaning that the condition that valid data appears at the input AND that the cell is empty is "FALSE".

As shown in FIG. 9 at a time t0', between t0 and t1, the value of VDi−1 changes from "0" to "1". At approximately the same time the value of the intermediate signal changes from "1" to "0". The output signal A of the second combination unit remains "1", as it only transmits the input value when the clock signal is "0". Hence the signal Cli remains "0" so that the charge controlling elements 35 and 36 remain disabled. Therewith the status section does not change the status of VDi−1 and VDi.

At time t1 the clock signal Cl assumes value "0", which causes the latch 37c to transmit the value of the intermediate signal Is to its output so that also the signal A becomes "0". The output clock signal Cli still remains "0", as now the inverted clock signal at the other input of the NOR-gate 37f has a value "1".

At time t2 the inverted clock signal becomes "0" causing the output signal Cli of the NOR-gate 37f to change from "0" to "1". This causes the MOS-transistors 45 and 47 in the data section to conduct. If the input data 40 is a logic "1", then the semiconductor element 44 in the first chain coupled to the data input 41 is blocked, while the semiconductor element 47 in the second chain coupled to the data input 41 is rendered conducting. If the input data is a "0" semiconductor element 44 is conducting and semiconductor element 47 is non-conducting This has the effect that the data Di−1 present at the input 41 is copied in an inverted form to the data output 42. As long as the FIFO comprises an even number of cells the data is provided at the output in its original form. The value "1" of the output clock signal Cli further causes the charge controlling element 35 to decharge the input node 32, so that the signal valid data VDi−1 at the input changes from "1" to "0". It further causes the charge controlling element 36 to charge the capacitive node 33 indicating that valid data is available in the data section of the cell. The intermediate signal therewith changes from "0" to "1".

At time t3 the clock signal Cl changes from "1" to "0". This has the effect that the current value "1" of the intermediate signal is transmitted to the output of the latch 37d, the signal A also changing from "0" to "1". As a result the output clock signal Cli changes from "1" to "0" so that the predecessor of the cell now can safely provide a new data Di−1 to the input node 41 of the data section 40 and a new valid data signal VDi−1 to the input 32 of the status section without causing this to overwrite the outputs 42 and 33 respectively.

Figure 10:
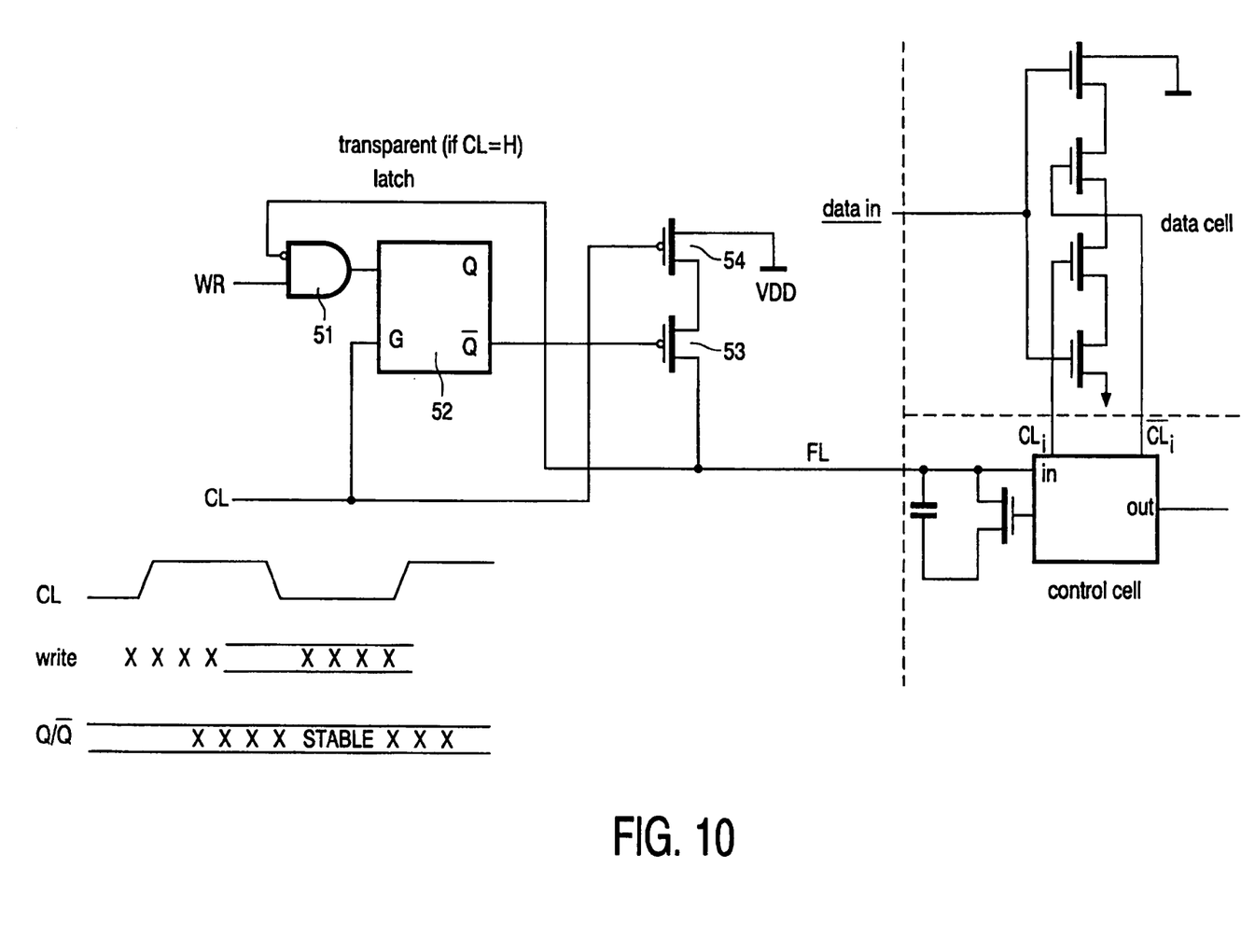
FIG. 10 shows an input section.

FIG. 10 shows an input stage 50 which is coupled to the status section 30 of the first cell 10.1. The input stage serves for selectively transmitting a write signal WR from an external datasource to the status input 32 during the periods that the clock CL is low. In this way it is prevented that an active high signal is offered to the status input 32 while the first switch 35 is in a conductive mode.

In the embodiment shown in FIG. 10 the input stage comprises a first combination element 51 for combining the write signal WR with the input status signal VD0. A logic high output signal of the combination element 51 indicates that the first location of the FIFO 10 is empty and that the write signal WR is active. This input status signal VD0 also serves to the external datasource as an indication whether the FIFO 10 has space available for writing new data. In the embodiment shown the output of the combination element 51 is coupled to the data input D of a latch 52 which further has a control input coupled to the clock CL. The status input is coupled via the main current path of a first controllable switching element 53 and the main current path of a second controllable switching element 54 to the first voltage line+. An inverse output $\overline{Q}$ of the latch 52 controls a first controllable switching element 53. The second controllable switching element 54 is controlled by the clock signal CL.

Figure 11:
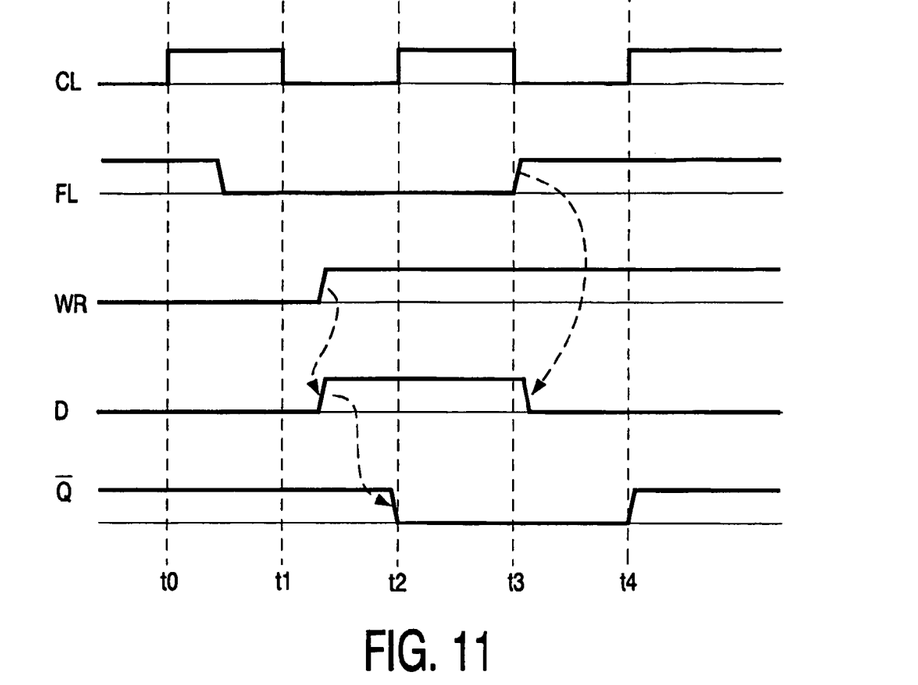
FIG. 11 shows the operation of the input section.

The operation of the circuit of FIG. 10 is illustrated by means of FIG. 11.

A shown therein, the signal FL (=VD0) changes from "1" to "0" in the time interval t0–t1. This indicates to an external data source that a location has emerged. If the external datasource now sets the write signal WR in the time interval t1–t2. Consequently the combination element 51 generates a logic high output signal at the D input of the latch. The latch 52 is transparent during the time intervals that the clock signal CL is "1", so that the inverse output $\overline{Q}$ of the latch assumes a logic low value from the moment t2. This has the consequence that the first controllable switching element 53 becomes conductive at that moment t2. The other controllable switching element 54 however remains in a non-conducting stage until the clock signal becomes logically low at t3. The status input 32 of the status section 30 of the first cell 10.1 is then charged. This does not interfere with the operation of switch 35, as this can only be conductive during intervals when the clock signal CL has a logically high value.

Figure 12:
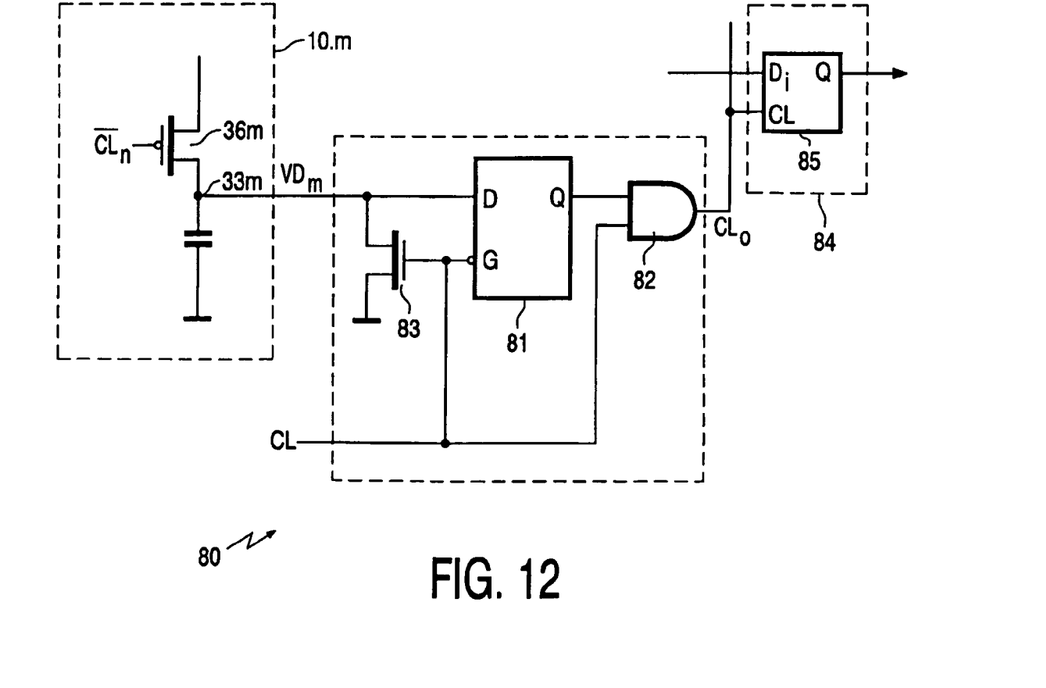
FIG. 12 shows the output section.

FIG. 12 shows an output stage 80 comprising a control section having an input for receiving the valid data signal VDm of the last register cell 10.m. The output stage has a control section comprising a latch 81 and AND-gate 82 for generating a clock signal CLo and a discharge element 83. It further comprises a data section 84 comprising one or more data registers 85 which are controlled by the clock signal CLo.

Figure 13:
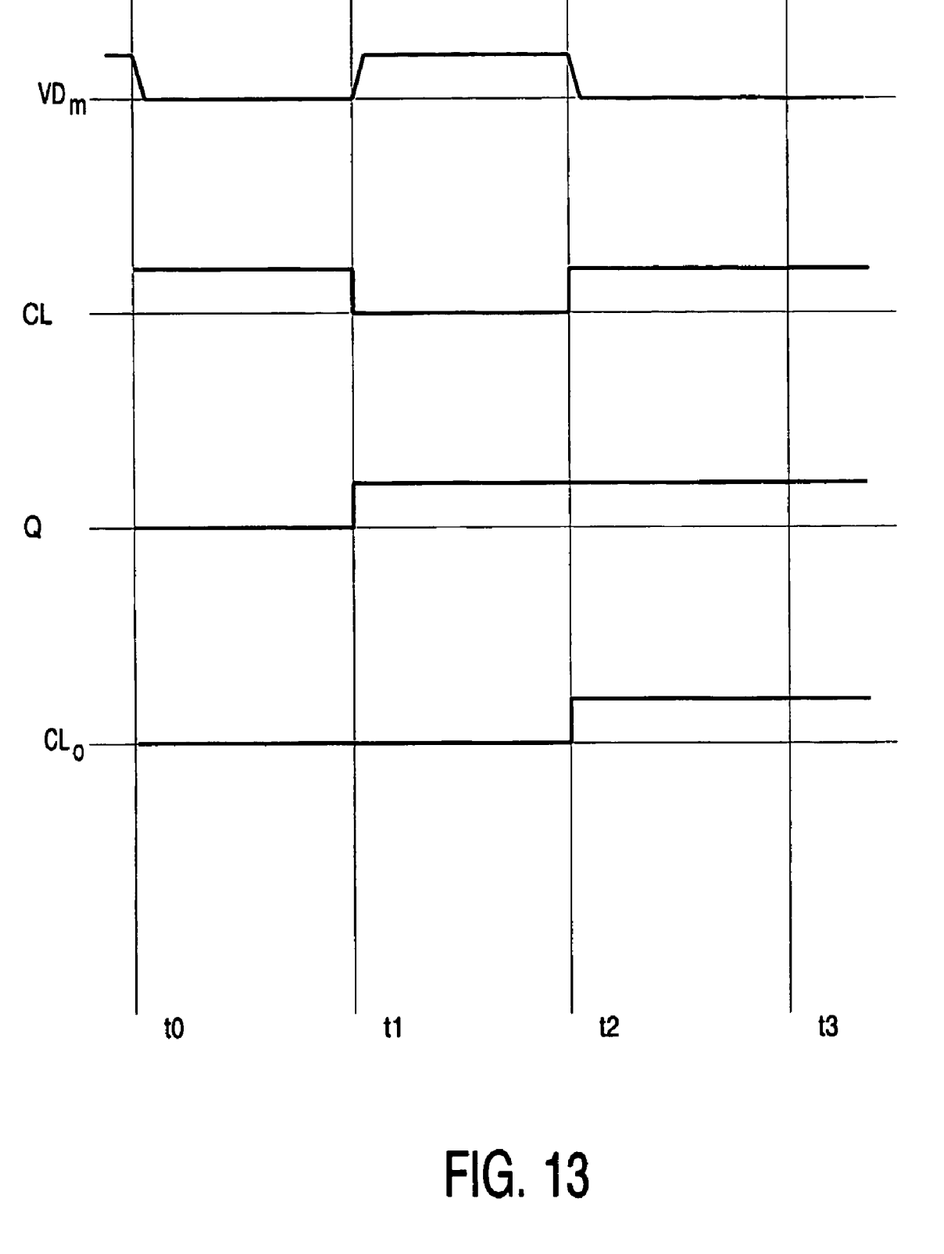
FIG. 13 shows the operation of the output section.

FIG. 13 schematically illustrates the operation of the output stage. In the period from t0 to t1 the signal VDm is maintained at a value "0" as the high value of the clock signal keeps the discharge element 83 conducting. In the period t1–t2 the discharge element 83 is no longer conducting so that the node 33m can be charged by the second charge controlling element 36m of the last register cell 10.m. For the present example it is assumed that the signal VDm assumes a value "1" in the time interval t1–t2. From t1 to t2 the output signal of latch 81 is transparent for the signal VDm and also has the value "1". The clock signal CLo remains "0". In the next time interval t2–t3 the latch is in its non-transparant state, so that its output signal Q remains "1". The transition of the clock signal CL from "0" to "1" now causes a transition of the output clock signal CLo at t2. At this transition the data which is dynamically stored in the data section of the last cell 10.m is stored in the data section 84.

It is remarked that the scope of protection of the invention is not restricted to the embodiments described herein. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features.

The invention claimed is:

1. A FIFO-register comprising a sequence of register cells, which register cells comprise a data section and a status section, in which data provided at an input is shifted via the data sections in the register cells to an output, the status section of each cell indicating whether the data section of that cell contains valid data, wherein the status section of the cells comprises
   a clock input for receiving an input clock signal,
   a status input for receiving an input status signal,
   a status output for providing an output status signal,
   a clock output for providing an output clock signal,
   a first charge controlling element coupled to the status input,
   a second charge controlling element coupled to the status output,
   a control unit coupled to the status input, to the status output and to the clock input, for generating the output clock signal, which output clock signal controls the charge controlling elements and the data section, wherein the status output of a status section shares a node with the status input of its successor for dynamic storage.

2. A FIFO-register according to claim 1, wherein the control unit comprises a first combination unit for combining the input status signal and the output status signal, and for providing in response to these signals an intermediate signal to a second combination unit, which combines the intermediate signal with the input clock signal and generates the output clock signal.

3. A FIFO-register according to claim 1, wherein the data section of the cell comprises a data input, a data output, a clock input for receiving the output clock signal from the clock output of the status section, the data output being coupled via a first chain to a first voltage line and via a second chain to a second voltage line, the first chain comprising the main current path of a first semiconductor element which is controlled by the data input, and a second semiconductor element which is controlled by the clock input, and the second chain comprising the main current path of a third semiconductor element which is controlled by the data input, and a fourth semiconductor element which is controlled by the clock input.

4. A FIFO-register according to claim 1, wherein the data section of the cell shares a capacitive node with the data section of a successor for storage of the data.

5. A digital signal processor comprising a first functional unit, and a second functional unit and a FIFO-register according to one of the previous claims for transferring data between the first and the second functional units.

* * * * *